(12) United States Patent
Hasan et al.

(10) Patent No.: US 9,047,237 B2
(45) Date of Patent: Jun. 2, 2015

(54) POWER SAVINGS APPARATUS AND METHOD FOR MEMORY DEVICE USING DELAY LOCKED LOOP

(75) Inventors: Qamrul Hasan, Santa Clara, CA (US); Clifford Zitlaw, Chico, CA (US); Stephan Rosner, Campbell, CA (US); Sylvain Dubois, Antibes (FR)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 305 days.

(21) Appl. No.: 13/566,187

(22) Filed: Aug. 3, 2012

(65) Prior Publication Data

US 2014/0040587 A1  Feb. 6, 2014

(51) Int. Cl.
*G06F 13/16* (2006.01)
(52) U.S. Cl.
CPC ............. *G06F 13/16* (2013.01); *Y02B 60/1225* (2013.01)
(58) Field of Classification Search
CPC ..... H03L 7/0802; H03L 7/08; G06F 13/1689; Y02B 60/1225
USPC .......... 711/167, E12.001; 327/141–142, 153, 327/156
See application file for complete search history.

(56) References Cited

U.S. PATENT DOCUMENTS

| 6,525,988 | B2 | 2/2003 | Ryu et al. | |
|---|---|---|---|---|
| 2007/0096783 | A1* | 5/2007 | de la Torre | 327/156 |
| 2009/0168568 | A1 | 7/2009 | Park | |
| 2012/0020171 | A1* | 1/2012 | Gower et al. | 365/193 |

FOREIGN PATENT DOCUMENTS

| KR | 10-2001-0004224 A | 1/2001 |
|---|---|---|
| KR | 10-2005-0123003 A | 12/2005 |

OTHER PUBLICATIONS

Jeon, Young-Jin et al., "A 66-333-MHz 12-mW Register-Controlled DLL With a Single Delay Line and Adaptive-Duty-Cycle Clock Dividers for Production DDR SDRAMs," IEEE Journal of Solid-State Circuits, vol. 39, No. 11, Nov. 2004, pp. 2087-2092.
International Search Report and Written Opinion of the International Searching Authority for International Application No. PCT/US2013/052852, mailed Nov. 28, 2013.

* cited by examiner

*Primary Examiner* — Jasmine Song

(57) ABSTRACT

Embodiments are directed to reduced power consumption for memory data transfer at high frequency through synchronized clock signaling. Delay locked loop (DLL) circuits are used to generate the synchronized clock signals. A DLL circuit consumes power as long as it is outputting the synchronized clock signals. A power saving apparatus and method are described wherein the DLL circuit is powered on when memory data access is active, while the DLL circuit is powered down when memory access is idle.

21 Claims, 4 Drawing Sheets

POWER SAVINGS APPARATUS AND METHOD FOR MEMORY DEVICE USING DELAY LOCKED LOOP

BACKGROUND

1. Field

The present invention relates generally to memory systems, and more particularly to delay locked loop (DLL) circuitry for use in memory systems.

2. Background Art

Data transmission speed requirements have dramatically increased over recent years, and will continue to do so for the foreseeable future. To meet these ever increasing data speed requirements, processors and memory devices have increased their performance, and will continue to increase their performance for the foreseeable future. One of the challenges of increasing memory device performance is to be able to increase the speed of transfer between the memory elements (e.g., memory controller and memory device) while maintaining the integrity of the data transfer.

High speed data transfer between the memory elements requires synchronization in order to maintain the integrity of the transfer. Such synchronization can be provided by a clock signal which provides a timing reference signal for the transfer of the data.

In addition to the increasing data speed requirements, system designers also seek to accomplish this increased functionality while occupying less volume and using less power.

BRIEF SUMMARY

A DLL (delay locked loop) circuit can provide a timing reference signal to synchronize and facilitate the transfer of data into and out of memory. In response to the above increasing functionality requirements, in an embodiment, it is desired that a DLL circuit use reduced power consumption while maintaining the reliability of the timing reference signals to assure the integrity of data transmission to and from memory devices. What is needed therefore is an apparatus and method by which a high-performance DLL circuit can be achieved while reducing power consumption.

In one embodiment of the present invention, a power savings apparatus and method are described for a memory controller and an associated memory device that uses a DLL circuit for data transmission synchronization. To reduce power consumption, the DLL circuit is switched on for the time period needed to support the memory data transfer, but is switched off at other times. By opportunistically taking advantage of typical duty cycles of memory controller activity, power consumption can be significantly reduced, without compromising the synchronization required to support high speed data transfer.

Further embodiments, features, and advantages of the invention, as well as the structure and operation of the various embodiments of the invention, are described in detail below with reference to the accompanying drawings.

BRIEF DESCRIPTION OF THE DRAWINGS/FIGURES

Figure 4:
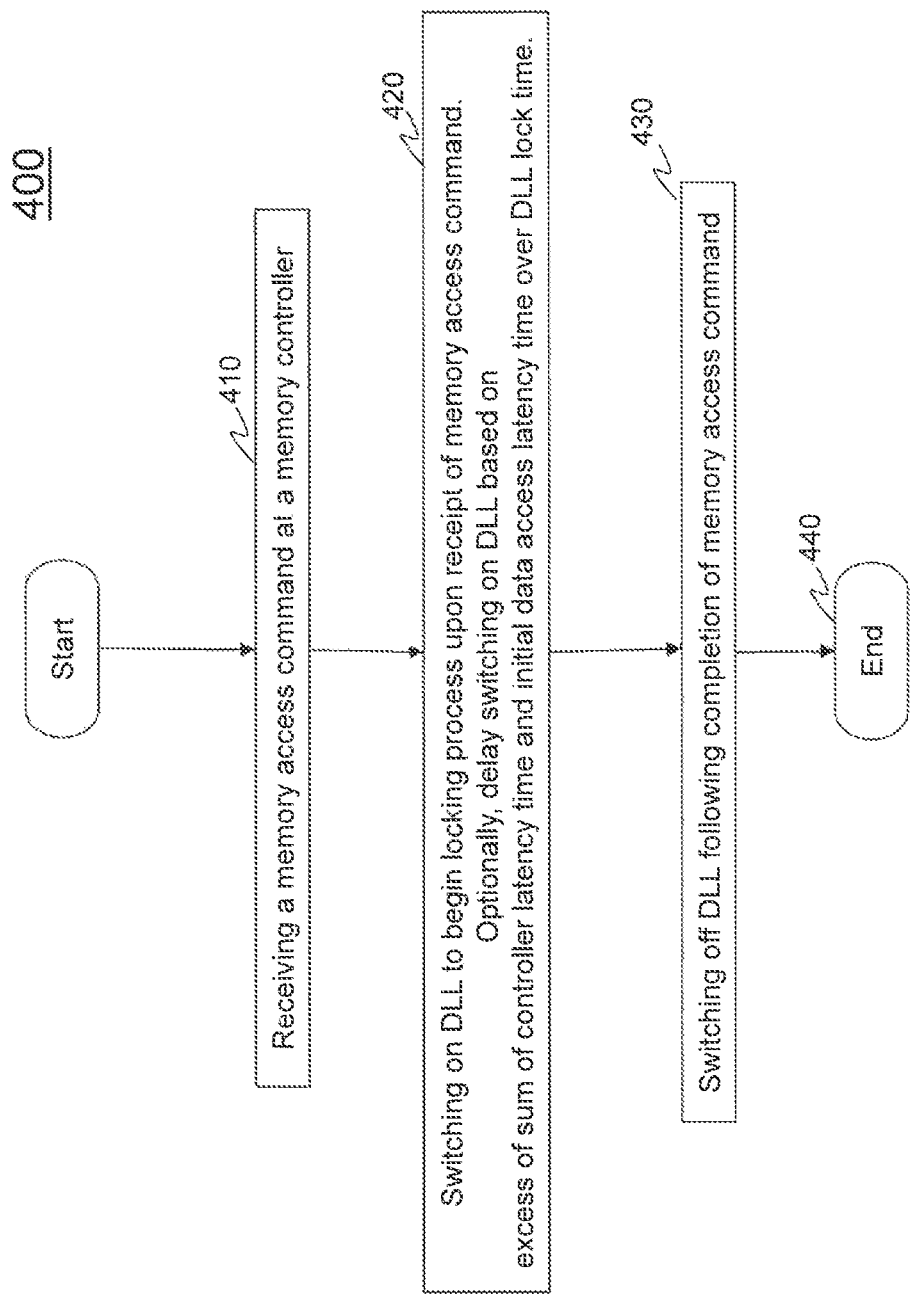

FIG. 4 provides a flowchart of a method for reducing power consumption of a DLL circuit, according to an embodiment of the present invention.

DETAILED DESCRIPTION OF TH INVENTION

Figure 1:
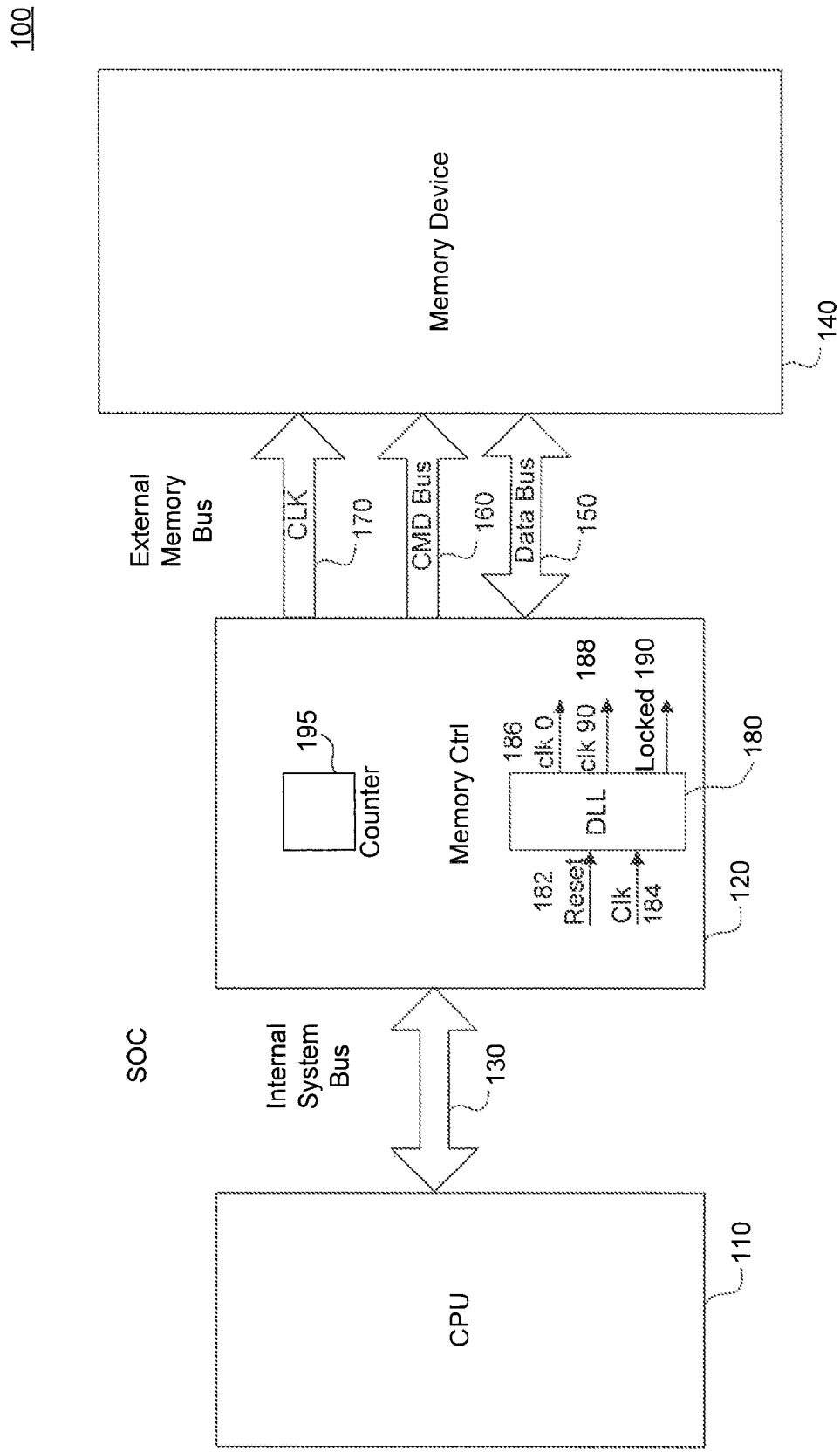
FIG. 1 illustrates a memory system, in accordance with an embodiment of the present invention.

FIG. 1 illustrates an exemplary embodiment of the present invention. FIG. 1 shows computing device 100, a typical CPU 110, memory controller 120 and memory device 140. CPU 110 sends one or more commands to memory controller 120 over the internal system bus 130. For each command received, memory controller 120 decodes the command and sends an appropriate memory command over the memory command bus 160 to memory device 140. Memory device 140 decodes the memory command. If it is a read command, memory device 140 sends data back to memory controller 120 over memory data bus 150. Memory controller 120 buffers the data and sends it back to the CPU 110 over internal system bus 130. Similarly, if the received memory command is a write command, data is sent via memory controller 120 to memory device 140 over memory data bus 150. Computing device 100 may be any system, product, compact device, apparatus, or portion thereof that includes data processing and memory access involving a CPU 110 and memory device 140, including (without limitation) a computer, a cellular telephone, a consumer applicant, an automobile, etc.

For high speed data access from memory, memory controller 120 includes DLL 180 which generates one or more phase-locked clock signals for synchronization. DLL 180 receives input signals, reset input signal 182 and reference clock input signal 184. When a reset input signal 182 is applied (e.g., the reset signal goes high, for example), DLL 180 is deactivated and is in a dormant mode. When a reset input signal 182 is removed (e.g., the reset signal goes low, for example), DLL 180 becomes active and begins the locking process. The locking process locks the one or more output clock signals to the reference clock input signal 184. Thus, for example, when DLL 180 is in its locked state, clock output signal (Clk0) 186 is locked to the reference clock input signal 184. If DLL 180 supports two or more clock output signals, then all of the clock output signals 186, 188 are locked to the reference clock input signal 184.

After removal of the reset signal, DLL 180 requires a finite time to reach its locked state following removal of the reset input signal 182. This finite time is referred to as the DLL lock time. After the DLL has reached its locked state, all clock output 186, 188 from DLL 180 becomes valid. Validity of the output clock signals 186, 188 can be indicated by locked signal output 190.

Figure 2:
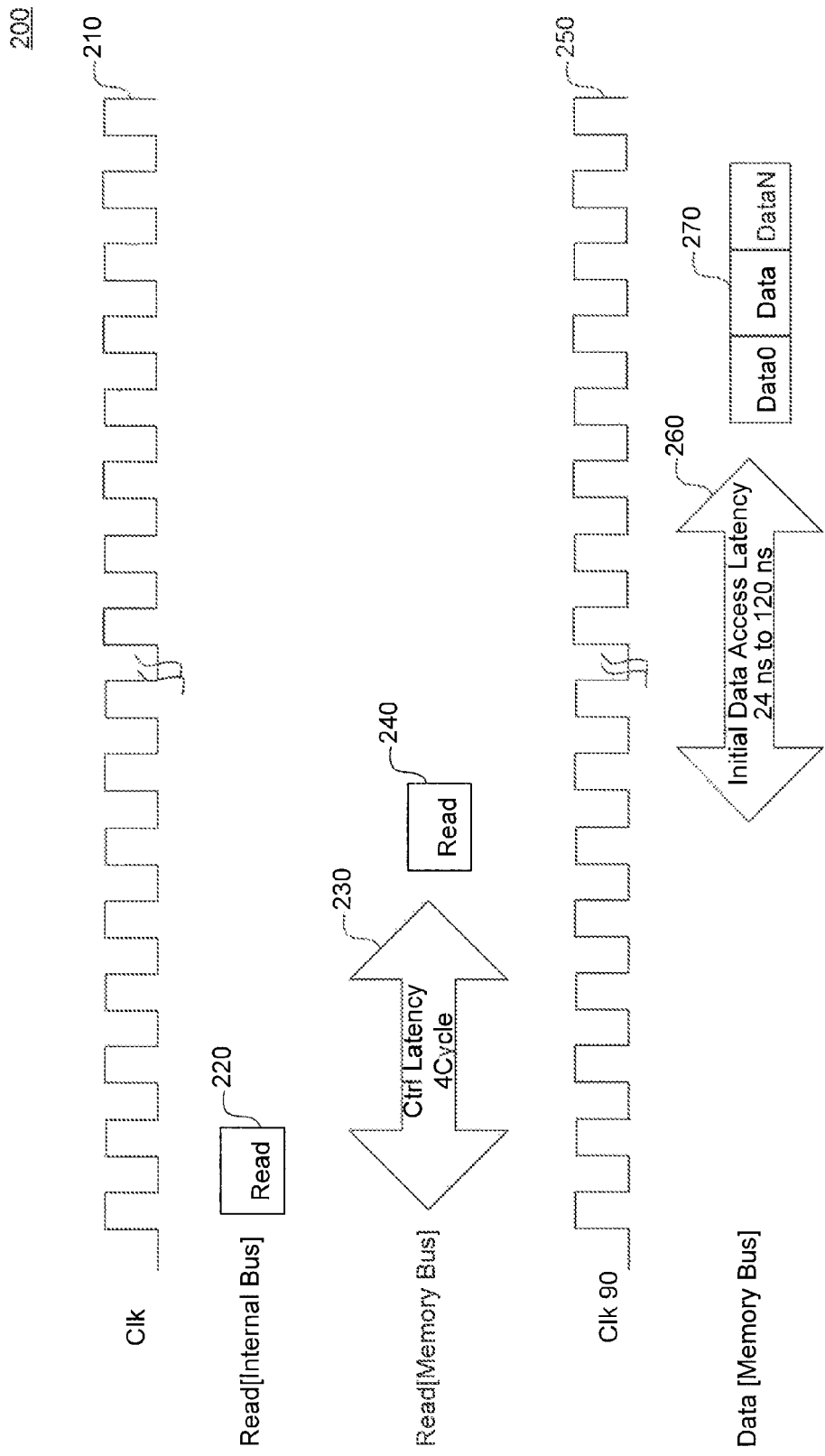
FIG. 2 illustrates a data read timing analysis diagram of a conventional memory system.

In FIG. 2, a high level timing diagram 200 for a conventional read operation is shown. The CPU 110 initiates a read operation by sending read command 220 on internal system bus 130. Memory controller 120 requires a finite time to decode the command. This finite time is shown as controller latency 230 in FIG. 2. After decoding, memory controller 120 sends read command 240 on memory command bus 160 to memory device 140. Reference clock input signal 210 is provided to DLL 180 to support the memory data access process. Memory device 140 starts sending the data back after the initial access latency time 260 of memory device 140. As shown in FIG. 2, memory data bus 150 actively transfers data 270 for only a short period. However, output clock signal 250 remains continuously active at all times. As a consequence, DLL 180 also remains active at all times. This results in considerable DLL power consumption, even though no use is made of the output clock signals from DLL 180 for a considerable portion of time.

Figure 3:
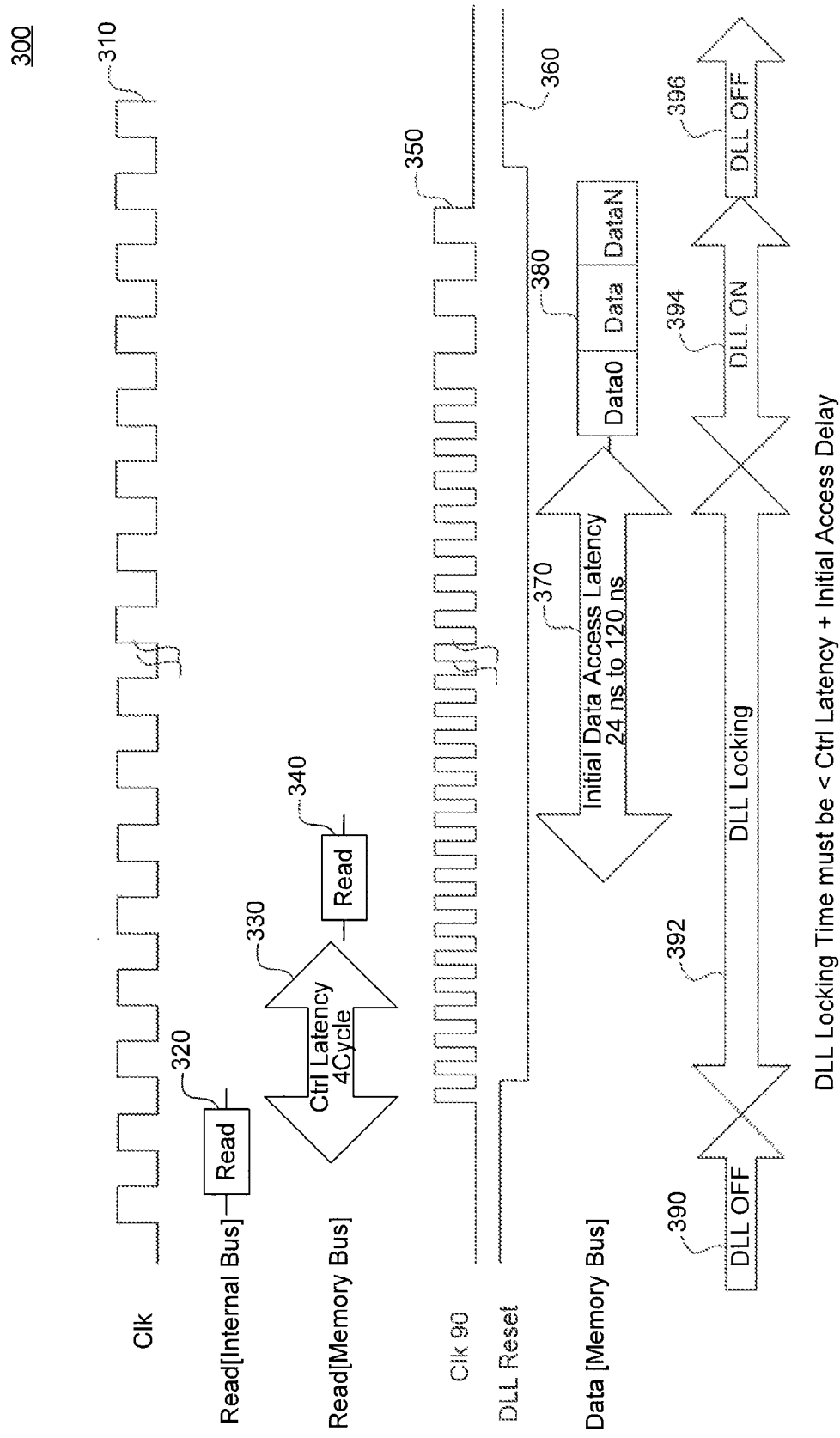
FIG. 3 illustrates a data read timing analysis diagram of a memory system, in accordance with an embodiment of the present invention.

FIG. 3 illustrates an embodiment of the present invention, wherein power consumption can be reduced. In FIG. 3, DLL 180 receives as input DLL reset signal 360 and clock reference input signal 310. As FIG. 3 illustrates, DLL 180 is initially in a reset or inactive mode 390 so clock output signal Clk90 350 is not being driven. When a read command 320 appears on internal system bus 130, memory controller 120 removes the reset signal 360 (e.g., the reset signal goes low) to cause the locking process 392 of DLL 180 to begin. As before, memory controller 120 decodes read command 320 and, after a control latency period 330, sends read command 340 over the memory command bus 160 to memory device 140. Memory device 140 decodes the read command. After an initial data access latency 370, memory device 140 sends data 380 back to memory controller 120 over memory data bus 150. During this data transfer process, DLL is in its locked state 394 and its clock output signal 350 is properly locked to clock reference input signal 310. Following completion of the data transfer process, DLL reverts back to its inactive state 396 by virtue of the input of reset signal 360 (e.g., the reset signal goes high). As before, memory controller 120 buffers the data and sends it back to the CPU 110 over internal system bus 130.

In its locked state, DLL 180 uses reference clock input signal 310 as a reference and generates Clk0 186 (not shown in FIG. 3) and Clk90 188 (Clk0 shifted by 90 degrees), which are locked to reference clock input signal 310. In an embodiment, Clk0 and CLk 90 are used for synchronization during the data transfer process. In another embodiment, a single reference clock output signal Clk90 188 can be used for synchronization during the data transfer process. In other embodiments, the number of DLL clock output signals are not limited to 1 or 2 clock reference output signals. For example, in other exemplary embodiments of the present invention, DLL 180 can generate more than 2 clock signals. For example, DLL 180 can generate other numbers of synchronized clock signals, including 4, 8, 16 synchronized clock signals. In these multiple clock signal embodiments, each clock signal is shifted in phase from the other clock signals.

The above description assumes a read command. However, embodiments of the present invention are not limited to a read command, but cover any memory access command. For example, and without limitation, if the received memory command is a write command, a similar process takes place, but with data beginning with CPU 110 and written to memory device 140 during the locked state 394 of DLL 180.

In this scheme, DLL 180 becomes locked just prior to when there are valid data 380 on the memory data bus 150. Thus, memory controller 120 needs to begin the locking process of DLL 180 early enough so that all output clocks from DLL 180 are locked and running when data needs to be captured. A principle of the above approach is that the DLL locking time 392 must be less than the sum of the control latency time 330 and initial data access latency time 370 so that DLL is locked at the proper time for synchronized data transfer. In particular, in an embodiment, the following equation must be satisfied:

$$\text{DLL Lock Time 392} < \text{Controller Latency 330} + \text{Initial Access Latency 320} \quad \text{Eq. (1)}$$

Since control latency time 330, initial data access latency time 370 and DLL lock time 392 are all known in advance, the validity of the above approach can be readily established for any particular choice of DLL 180, memory controller 120 and memory device 140.

As noted above, and as illustrated in FIG. 3, locking of DLL 180 can commence immediately upon receipt of a memory access command (such as read command 320) by memory controller 120. In a further embodiment of the present invention, locking of DLL 180 can be delayed to further reduce power consumption. For example, the excess of the sum of the control latency time 330 and initial data access latency time 370 over DLL locking time 392 can be exploited by delaying the locking of DLL 180 until the latest possible time. By delaying the commencement of the locking 392 of DLL 180, additional power consumption is reduced.

Various schemes can be adopted to effect the delay to commence locking of DLL 180. In an exemplary embodiment, a counter 195 in memory controller 120 can be used to count the amount of time delay (e.g., clock cycles) between receipt of a memory access command (e.g., read command 320) and commencement of locking of DLL 180. By either using counter 195 to count up to the desired delay, or using counter 195 to count down from the known delay to zero, counter 195 outputs a signal which is used to form reset signal 182 to DLL 180.

In a still further embodiment of the present invention, counter 195 can be a dynamic counter that can respond to real-time changes in controller latency time 330 and initial data access latency time 370 to the extent that these times are dynamically measurable and can be communicated to counter 195.

In an exemplary embodiment, the lock time of DLL 180 can range from 6 cycles to 40 cycles or more. In such an embodiment, controller latency time can be typically 4 to 10 cycles and initial access latency time can vary from 24 ns (8 cycles for 333 MHz clock) for a fast DRAM type device to 120 ns (17 cycles for 133 MHz clock) for non-volatile memory NOR type of device. Such parameter values give the designer an abundance of opportunities to satisfy Eq. (1) above and incorporate the changes.

FIG. 4 provides a flowchart of an exemplary method 400 to provide reduced power consumption (as well as related advantages such as reduced heat generation, increased working life, etc.) in a high speed memory access apparatus, according to an embodiment of the present invention.

The process begins at step 410. In step 410, a memory access command is received by a memory controller. In an embodiment, memory controller 120 would receive a memory access instruction (e.g., a read command 320, a write command, etc.) from CPU 110 via internal system bus 130.

In step 420, in response to such receipt, DLL 180 is switched on at the turn-on time. In an embodiment, switching on DLL 180 is achieved by removal of the reset signal 360 (e.g., reset signal 360 goes low) and the locking process commences, with subsequent data transfer occurring while DLL 180 is in a locked state. The turn-on time for a DLL is determined so that the DLL is locked at or prior to the required memory data transfer. In an embodiment, the turn-on time for DLL 180 is determined based on DLL lock time 392, controller latency time 330 and initial data access latency time 370. DLL 180 can be turned on immediately upon receipt of memory access command by memory controller 120. Alternatively, the turn-on of DLL 180 can be delayed based on the excess of the sum of controller latency time 330 and initial data access latency time 370 over the DLL lock time 392. In an exemplary embodiment, counter 195 can be used to implement the delay prior to DLL 180 being turned-on.

In step 430, data transfer completes and DLL 180 switches off. In an embodiment, memory controller 102 recognizes completion of data transfer and applies reset signal 360 (e.g., reset signal 360 goes high) to DLL 180.

At step 440, method 400 ends.

As noted previously, the above descriptions are exemplary illustrations of exemplary architectures to Which the above approach can be deployed. For example, other systems, methods or applications in which synchronized clock signals are required for low duty cycle scenarios can also use the above approach.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A memory apparatus, comprising:
   a delay locked loop (DLL) having a DLL lock time;
   a memory device having an initial data access latency time; and
   a memory controller having a controller latency time, and configured to receive a memory access instruction, the memory controller providing a DLL turn-on command to the DLL based on receipt of the memory access instruction, the controller latency time, the initial data access latency time and the DLL lock time,
   wherein the sum of controller latency time and initial data access latency time exceeds the DLL lock time.

2. The memory apparatus of claim 1, wherein the DLL is in a locked state when valid data is on a data bus, the data bus configured to provide coupling between the memory device and the memory controller.

3. The memory apparatus of claim 1, wherein the DLL outputs a clock signal (clk0) and a clock-90 (clk90) signal that is 90 degrees ahead in phase to the clock signal (clk0).

4. The memory apparatus of claim 1, wherein the DLL receives the DLL turn-on command via a reset signal port.

5. The memory apparatus of claim 1, wherein the DLL outputs a plurality of synchronized clock signals, wherein each clock signal is shifted in phase from the other clock signals, the plurality of synchronized clock signals being one of 4, 8, and 16 synchronized clock signals.

6. The memory apparatus of claim 1, wherein the DLL reverts to a powered-down state following completion of the memory access instruction.

7. The memory apparatus of claim 1, further comprising:
   a counter coupled to the DLL, the counter being configured to delay receipt of the DLL turn-on command by a delay that does not exceed the excess of the sum of controller latency time and initial data access latency time over the DLL lock time.

8. The memory apparatus of claim 1, wherein the memory access instruction comprises a memory read instruction and a memory write instruction.

9. The memory apparatus of claim 1, further comprising a CPU coupled to the memory controller via an internal system bus.

10. The memory apparatus of claim 1, further comprising:
    a dynamic counter coupled to the DLL, wherein the dynamic counter is configured to delay receipt of the DLL turn-on command by a delay that does not exceed the excess of the sum of controller latency time and initial data access latency time over the DLL lock time, and wherein the dynamic counter is configured to respond to real-time changes in one or more of the controller latency time and the initial data access latency time.

11. A method, comprising:
    receiving a memory access instruction at a memory apparatus, the memory apparatus comprising a memory device having an initial data access latency time, a delay locked loop (DLL) having a DLL lock time, and a memory controller having a controller latency time;
    generating a DLL turn-on command based on the receipt of the memory access instruction, the controller latency time, the initial data access latency time and the DLL lock time;
    locking the DLL in response to receiving the DLL turn-on command; and
    delaying locking the DLL based on the excess of the sum of controller latency time and initial data access latency time over the DLL lock time.

12. The method of claim 11, wherein the locking the DLL has completed and resulted in a locked state when valid data is on a data bus, the data bus configured to provide coupling between the memory device and the memory controller.

13. The method of claim 11, further comprising outputting a clock signal (clk0) and a clock-90 signal (clk90) that is 90 degrees ahead in phase to the clock signal (clk0).

14. The method of claim 11, wherein the locking the DLL in response to receiving the DLL turn-on command includes receiving the DLL turn-on command via a reset signal port.

15. The method of claim 11, further comprising outputting a plurality of synchronized clock signals, wherein each clock signal is shifted in phase from the other clock signals, the plurality of synchronized clock signals being one of 4, 8, and 16 synchronized clock signals.

16. The method of claim 11, further comprising accessing the memory device after the locking the DLL is complete.

17. The method of claim 11, further comprising: reverting DLL to a powered-down state following completion of the memory access instruction.

18. The method of claim 11, wherein the delaying includes using a counter.

19. The method of claim 11, further comprising: decoding the memory access instruction.

20. The method of claim 11, wherein the delaying includes using a dynamic counter that can respond to real-time changes in one or more of the controller latency time and the initial data access latency time.

21. A system, comprising a memory apparatus, the memory apparatus comprising:
- a delay locked loop (DLL) having a DLL lock time;
- a memory device having an initial data access latency time; and
- a memory controller having a controller latency time, and configured to receive a memory access instruction, the memory controller providing a DLL turn-on command to the DLL based on receipt of the memory access instruction, the controller latency time, the initial data access latency time and the DLL lock time,
- wherein the sum of controller latency time and initial data access latency time exceeds the DLL lock time.

\* \* \* \* \*